G. R. HORTON & J. M. MILLER.
SHUTTER OPERATING ATTACHMENT FOR CAMERAS.
APPLICATION FILED MAY 8, 1917.

1,277,592.

Patented Sept. 3, 1918.

Inventors:
Gilbert R. Horton and
John M. Miller
by James T. Bentelew
their Attorney.

UNITED STATES PATENT OFFICE.

GILBERT R. HORTON AND JOHN M. MILLER, OF JAMESTOWN, NORTH DAKOTA.

SHUTTER-OPERATING ATTACHMENT FOR CAMERAS.

1,277,592.   Specification of Letters Patent.   Patented Sept. 3, 1918.

Application filed May 8, 1917.   Serial No. 167,380.

*To all whom it may concern:*

Be it known that we, GILBERT R. HORTON, and JOHN M. MILLER, citizens of the United States, both residing at Jamestown, in the county of Stutsman, State of North Dakota, have invented new and useful Improvements in Shutter-Operating Attachments for Cameras, of which the following is a specification.

This invention relates to an electro-magnetic distance actuating mechanism for cameras, shutters and the like; and its chief object is the provision of means whereby accurate and positive action of the camera shutter may be caused by the operator though he may be at any distance.

One of the great inconveniences we seek to overcome in our present invention is the inability of ordinary pneumatic or electro-pneumatic devices to hold their compression for more than a few minutes without resetting. We believe this to be particularly advantageous for naturalists' work, as the camera may be set and operated after any length of time and from any distance whatever; the distance only being limited by the strength of the battery used. Furthermore, after an exposure has been made the shutter can not be operated accidentally or otherwise without first resetting the actuator. This insures the sensitive element against double exposure.

With this general broad conception of the object of our invention, we will proceed to a more detailed explanation, referring to the accompanying drawings, in which.

Figure 1:
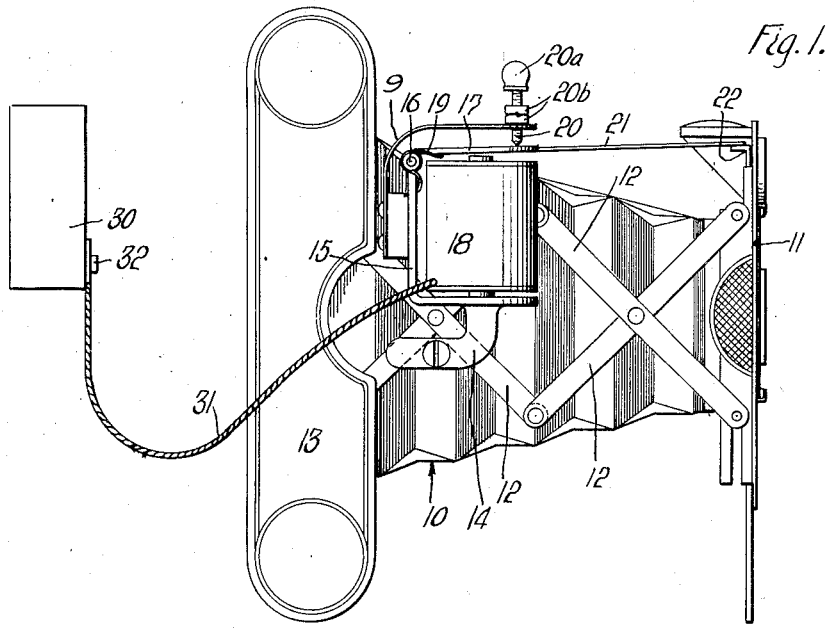
Figure 1 is a side elevation of our device as it appears in use.
Figure 2:
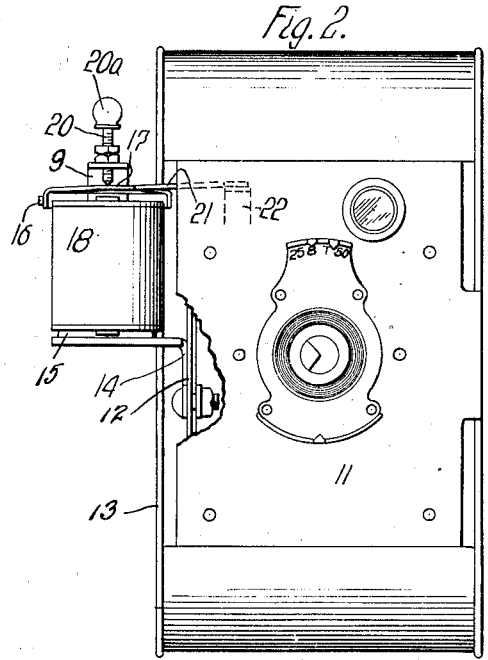
Fig. 2 is a front elevation of the same.

In the drawings 10 designates a typical camera and 11 the front board thereof. Expanding frames 12 connect the camera body 13 and the front board 11; and to these frames our device is attached on this particular camera. A suitable bracket 14, of any design, preferably detachable is secured to frames 12. Bracket 14 carries a magnet frame 15 of the configuration shown in Fig. 1. This frame carries pivot 16 at its upper end, to which pivot the armature 17 is attached. Electro-magnet 18 is situated beneath armature 17, and the armature may be supported by a small spring 19, although this not not necessary on all cameras. A stop screw 20 having a thumb nut $20^a$ limits the upward movement of the armature, the distance depending upon the travel of the shutter lever. The armature has an extension arm 21 whose end rests upon shutter actuator 22, this being the means through which the shutter is ordinarily operated. The shutter is illustrated at 23, and its spring is designated 24. In the position shown, the spring will tend to close the shutter, while pressure upon member 22 will open the shutter. Continued pressure on the member 22 will hold the shutter open for a corresponding duration, when the shutter is set on bulb. (We have shown the parts in this arrangement particularly as we wish to explain the action of our device and its advantages in this connection; but it will be understood that the shutter may be arranged for "time" and "instantaneous" exposures as well.)

Magnet 18 is energized from any source, say from a battery 30, connections being made through wires 31 and electrical control being had by push button switch 32. When the push button is operated current is supplied to the magnet. This causes the movement of armatures 17 and the opening of the shutter. With the parts arranged as shown, continued pressure on the push button will hold the shutter open. Thus a person may operate the camera on "bulb" at a distance limited only by the length of wires 31 and the strength of the battery.

Figure 3:
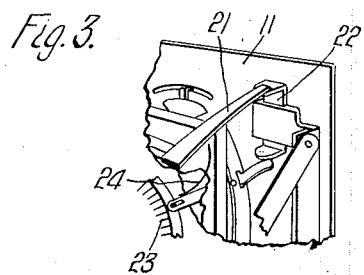
Fig. 3 is a perspective detail showing a portion of the shutter mechanism.

A feature of the arrangement especially desirable is the necessity of resetting before a second exposure can be made. Once the shutter has been opened and closed it can not again be opened by operation of armature 17 until the screw 20 has been moved upwardly to allow the member 22 its full upward movement to re-set the shutter. Then the screw must be moved down again to bring the armature within action radius of the magnet 18. (The locknuts $20^b$ move with the screw 20, these nuts forming in reality an adjustable stop for the downward movement of the screw.) This desirable necessity is brought about by the fact the shutter action only takes place when the member 22 is traveling through the lower part of its movement; but that, in order to set the shutter for another actuation, the member 22 must be allowed to move to its upper limiting position (higher than shown in Fig. 3); and it is also brought about by the fact that it is not desirable to make the electro-magnet of sufficient size and strength to move the armature through a distance corresponding with the total movement of member 22.

Having described our invention, we claim:

1. In combination with a camera having a shutter mechanism and a movable operating member therefor, the shutter mechanism being operated by the latter part of the movement of said member in one direction but it being necessary to move said member back to a point beyond the position of beginning of shutter operation in order to set the shutter mechanism for a subsequent operation; a means for moving said operating member in its shutter operating direction, and a manually movable stop to limit the back motion of said member to substantially the position in which the shutter mechanism begins operation.

2. In combination with a camera having a shutter mechanism and a movable operating member therefor, the shutter mechanism being operated by the latter part of the movement of said member in one direction but it being necessary to move said member back to a point beyond the position of beginning of shutter operation in order to set the shutter mechanism for a subsequent operation; a movable armature connected with said operating member, an electro-magnet for moving the armature in a direction to cause shutter operation, and a normally movable stop to limit the movement of the armature in the opposite direction, the stop being normally in such a position as to limit the back motion of the armature and arm to approximately the position in which the shutter begins operation.

In witness that we claim the foregoing we have hereunto subscribed our names this 11th day of April, 1917.

GILBERT R. HORTON.
JOHN M. MILLER.

Witness:
J. H. GANLEY.